United States Patent [19]

Joseph, Jr. et al.

[11] Patent Number: 4,655,435
[45] Date of Patent: Apr. 7, 1987

[54] CATTLE GUARD

[76] Inventors: Daniel Joseph, Jr.; Phil T. Archuletta, both of P.O. Box 67, Ojo Caliente, N. Mex. 87549

[21] Appl. No.: 686,297

[22] Filed: Dec. 26, 1984

[51] Int. Cl.$^4$ ................................................. A01K 3/00
[52] U.S. Cl. ........................................ 256/17; 256/14; 256/65; 49/33; 119/155
[58] Field of Search ................ 256/65, 14, 17, 18, 256/19; 49/131, 33; 119/155

[56] References Cited

U.S. PATENT DOCUMENTS

| | | | |
|---|---|---|---|
| 1,509,739 | 9/1924 | McLean | 256/14 |
| 1,688,238 | 10/1928 | Kamas | 49/33 X |
| 2,591,220 | 4/1952 | Welter | 49/33 X |
| 2,592,225 | 4/1952 | Wrinkler | 256/14 |
| 2,618,469 | 11/1952 | Mayer | 256/17 |
| 3,790,135 | 2/1974 | Christianson | 256/17 |

FOREIGN PATENT DOCUMENTS

| | | | |
|---|---|---|---|
| 156385 | 5/1954 | Australia | 256/17 |
| 407642 | 9/1966 | Switzerland | 256/17 |

Primary Examiner—Cornelius J. Husar
Assistant Examiner—Joseph A. Fischetti
Attorney, Agent, or Firm—Andrus, Sceales, Starke & Sawall

[57] ABSTRACT

A cattle guard has a grid with a plurality of spaced bars lying transverse to the direction of travel across the guard. The bars are supported by a plurality of spaced beams lying beneath the bars. The grid, in turn, is supported by a base in the ground. The base comprises a pair of side members positioned transverse to the direction of travel across the guard. Each of the side members has a side wall with a box-like flange member lying normal to the side wall and extending into the base. The grid rests on the flange member when the cattle guard is assembled and retained in position with respect to the base by locking elements. A plurality of columns extend between upper and lower walls of the flange member to support the grid. The base has a pair of end walls fastened to the side members during installation to complete the construction of the base.

12 Claims, 5 Drawing Figures

CATTLE GUARD

The present invention relates to an improved cattle guard that is low in cost, light in weight, and conveniently portable to the installation site in component parts that can be easily assembled without special tools or equipment.

A cattle guard occupies a gap in a fence. The guard has a number of spaced bars lying transverse to the direction of travel across the gate. A pit lies beneath the bars. Cattle will not cross the cattle guard because the bars over the pit do not provide adequate footing. However, vehicles and pedestrians can easily pass across the bars and the gate.

To install a conventional cattle guard, a pit or ditch is dug at the gap in the fence. At the present time, a timber liner is constructed in the pit to prevent subsidence. Or, a precast concrete liner may be employed. The bars are then laid on the liner and sidewings installed to connect the cattle guard to the fence.

It will be appreciated that the construction of a timer liner is time consuming and expensive. A prefabricated concrete liner is heavy and requires special equipment for transport and installation. These factors increase the cost of installing the cattle guard.

The object of the present invention to provide an improved cattle guard that is simple and economical in construction and installation. To this end, the cattle guard of the present invention has a base member lining the pit that is constructed of sheet metal components that can be assembled on site. The use of sheet metal and a prefabricated construction provides lightweight elements that can be easily transported and manipulated. The components can be quickly and easily assembled on site without the need for special tools. At the same time, however, the cattle guard of the present invention is capable of withstanding heavy vehicular loads such as those exerted by logging trucks. The components are so formed as to reduce filling up of the pit by water or windborne dirt or sand and to facilitate removal of same if such does occur.

The cattle guard described herein includes a grid that is positioned generally flush with the surface of the ground when the guard is installed. The grid has a plurality of spaced bars lying transverse to the direction of travel across the guard. The bars are supported by a plurality of spaced beams lying beneath the bars. The grid, in turn, is supported by a base that is positionable in the ground when the guard is installed. In accordance, with the present invention, the base comprises a pair of side members positioned transverse to the direction of travel across the guard. Each of the side members has a side wall with a box-like flange member lying normal to the side wall and extending into the base. The grid rests on the upper wall of the flange member when the cattle guard is assembled. The lower wall of the flange member rests on the ground. A plurality of columns extend between upper and lower walls of the flange member to support vehicular and other loads applied to the grid. The base has a pair of end walls fastened to the side members to complete the construction of the base. Locking elements formed of angle members retain the grid in position on the base member.

Typically, a plurality of grid and base units arranged in tandem across the gap in the fence are used depending on the desired width of the cattle guard. The end walls may have openings permitting water to flow through the cattle guard.

The invention will be further understood by reference to the following description and accompanying drawings.

Figure 1:
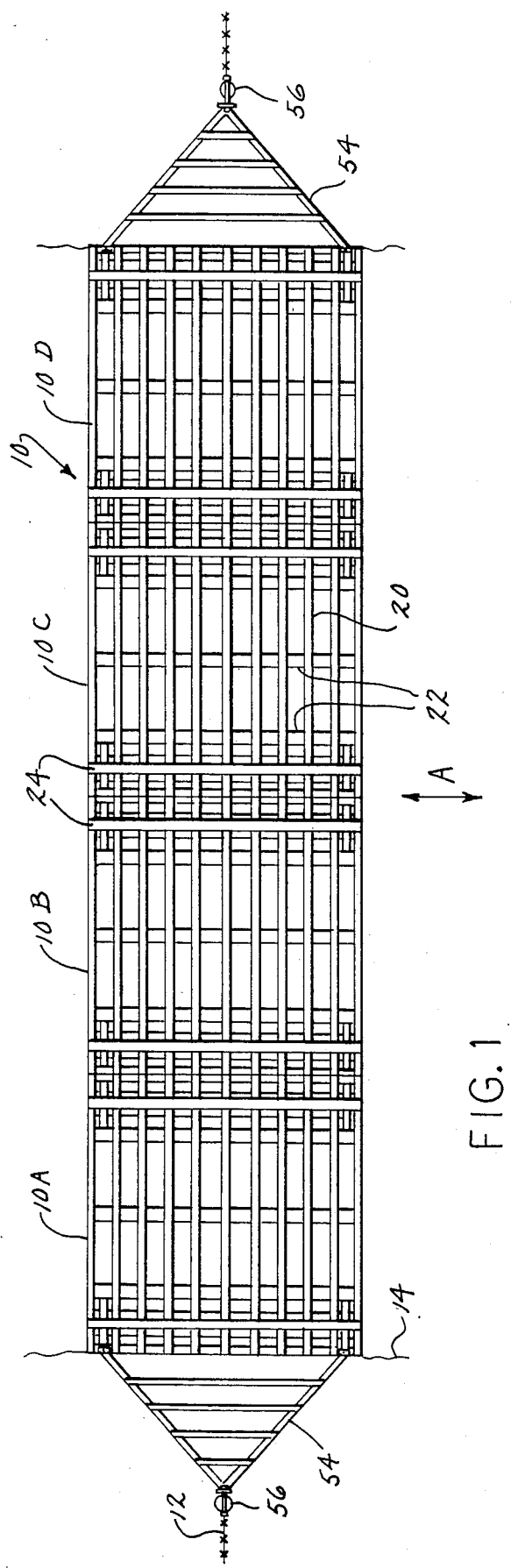
FIG. 1 is a top view of a cattle guard constructed in accordance with the present invention.

In the figures, a cattle guard of the present invention is indicated by the numeral 10. Cattle guard 10 may be positioned in a gap in barbed wire fence 12 to provide a path for road 14 through the fence. The direction of travel along road 14 and across gate 10 is indicated by the arrow A in FIG. 1.

Figure 2:
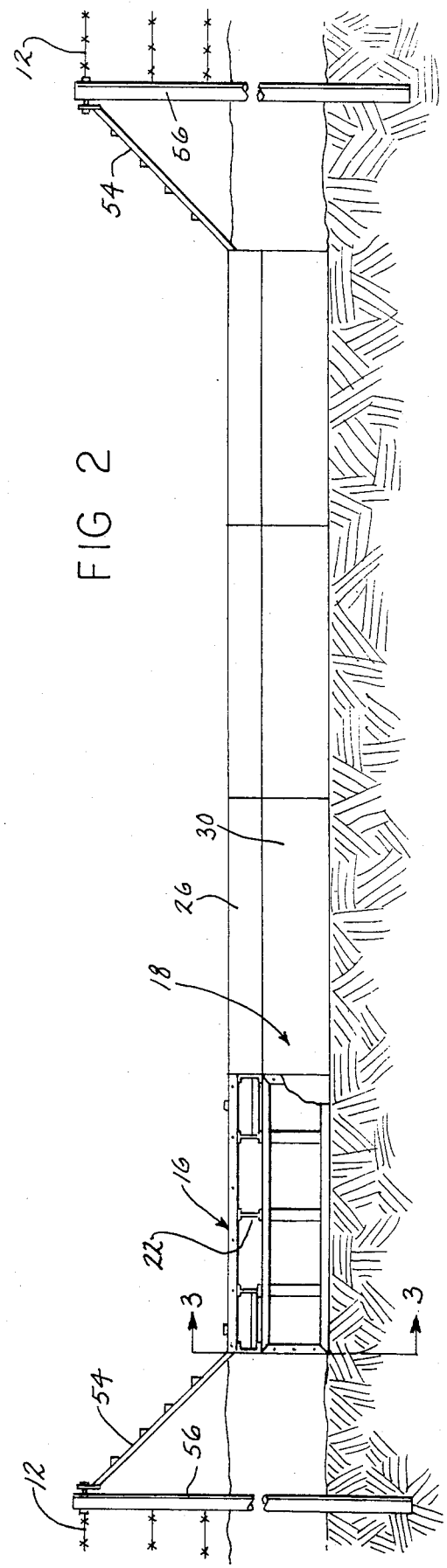
FIG. 2 is a partially cut-away side view of the cattle guard.

As shown most clearly in FIGS. 1 and 2, cattle guard 10 may be comprised of a plurality of sections 10A, 10B, 10C, and 10D that accommodate various widths of road 14. Each section of cattle guard 10 may typically have a seven foot length and a seven foot width so that cattle guard 10 is seven feet long in the direction of travel and can have a desired width in seven foot increments.

Each section of cattle guard 10 includes a grid 16 and a base 18. Grid 16 supports vehicles and pedestrians passing through the cattle guard while preventing the passage of hooved animals, such as cattle. Base 18 is placed in an excavation or pit in the ground and supports grid 16.

Figure 4:
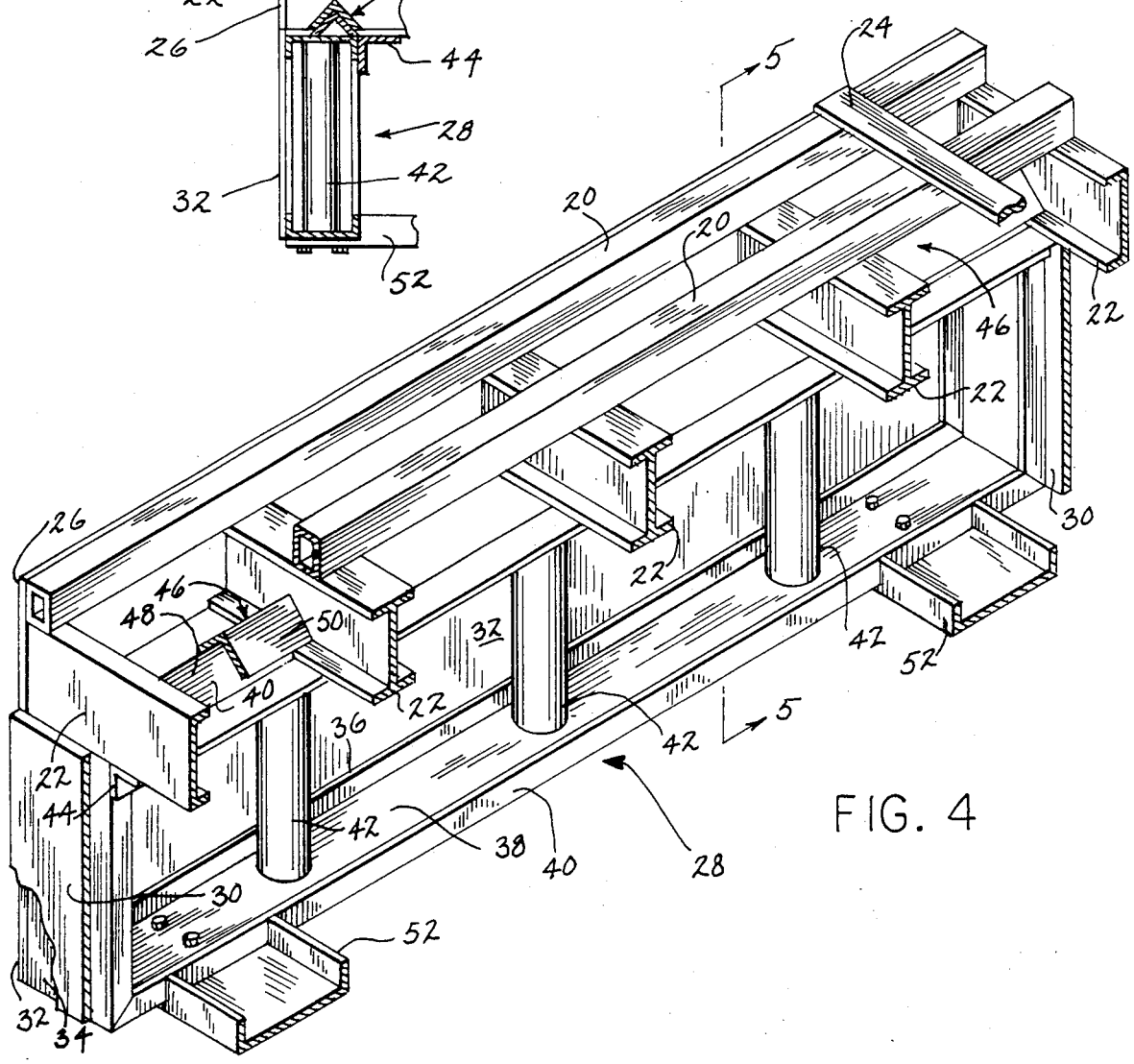
FIG. 4 is a partial, perspective view of a portion of the grid and base of the cattle guard.

As best shown in FIGS. 1 and 4, grid 16 includes a plurality of spaced bars 20 lying transverse to the direction of travel across gate 10. Bars 20 are fastened to, and supported by, spaced beams 22 lying parallel to the direction of travel. Beams 22 are shown as I beams and channel beams in FIG. 4. Straps 24 may be fastened to bars 20 parallel to beams 22 and parallel to the direction of travel through the gate. Sheets 26 are fastened to the ends of I beams 22 and to sides of outermost bars 20.

Figure 5:
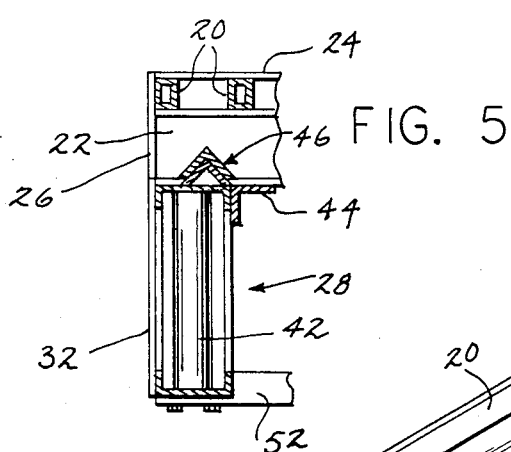
FIG. 5 is a cross sectional view taken along the line 5—5 of FIG. 4.

Base 18 comprises a pair of spaced side members 28, one of which is shown in FIGS. 4 and 5, lying normal to the direction of travel. The ends of beams 22 rest on side members 28. Side members 28 are joined by end walls 30.

Side members 28 include side walls 32. As best shown in FIGS. 4 and 5, a box-like rectangular flange member 34 extends from side wall 32 of each of side members 28 along the periphery of the side wall. Flange member 34 may be in the form of a channel having an inner flange 36 fastened to side wall 32, a web 38 normal to side wall 30 and an outer flange 40. A plurality of columns 42 extend between the upper and lower portions of side wall 32 and support beams 22 and grid 16. Angle member 44 may be fastened to the upper portion of outer flange 40 to assist in supporting grid 16.

As shown in FIGS. 4 and 5, locks 46 are provided to prevent grid 16 from shifting position on base 18 when cattle guard 10 is assembled. A lock 46 is provided on each end of each of side members 28. A lock 46 includes an element 48 fastened on the upper surface of side member 26. Element 48 may be formed of an inverted angle iron having a length corresponding to the distance between two beams 22. When cattle guard 10 is assembled, element 48 fits between the two beams and prevents grid 16 from shifting on base 18 transverse to the direction of travel along road 14.

A second element 50 formed complementary to element 48 is fastened between two adjacent beams 22. Element 50 may be formed of an inverted angle iron and, when placed on element 48, prevents grid 16 from shifting on base 18 in the direction of travel along road 14.

Figure 3:
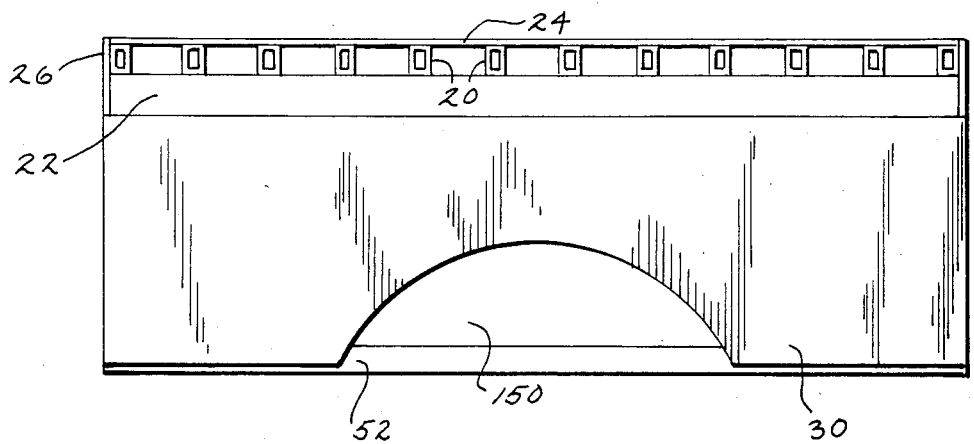
FIG. 3 is an end view of the cattle guard taken along the line 3—3 of FIG. 2.

End walls 30, one of which is shown in detail in FIG. 3, connect side members 28 together. The height of end walls 30 is generally the same as the height of flange member 34. End walls 30 have openings 150 that permit water to pass easily through cattle guard 10. This lessens the deposition of sand and dirt in base 18 and permits flushing of any accumulations that may occur. Channels 52 are mounted to the bottom portion of flange member 32 of each of side members 28 to extend between two side members 28. Channels 52 may be formed of channel members having the edges cut off at the ends to permit the web to fit under the lower portions of flange members 34.

Base members 18 are formed from metal sheets, plates, and other elements assembled by welding.

In constructing cattle guard 10, grid 16 is fabricated as a unit. Each of side members 28 is fabricated as a unit. End walls 30 and channels 52 and columns 42 are fabricated as separate units. The components of cattle guard 10 may thus be easily transported to the installation site because of their relatively small size and weight. As many component sets are provided as are needed to establish the desired width of the cattle guard.

At the installation site, a pit is dug in the gap in barbed wire fence 12. Bases 18 are assembled by bolting channels 52 to the lower portions of flange members 34 also bolting and end walls 30 to the end portions of flange members 34. The bases 18 are positioned in a line and are bolted together by bolts extending through the adjacent end portions of flange members 34. The assembled bases 18 are then lowered into the pit. Or, the components of bases 18 may first be placed in the pit and thereafter assembled there. An individual base 18 formed in accordance with the present invention weighs about 1,200 pounds. This compares to approximately 4,000 pounds for a corresponding base structure of timber or concrete.

A grid 16 is then placed on each base 18 so that it rests on the upper portions of flange members 34 and angle members 44 and so that locking elements 48, 50 engage. The pit is then backfilled around bases 18. Side wings 54 are fastened between cattle guard 10 and the adjacent fence posts 56 to complete the installation of cattle guard 10. Side wings 54 may be bolted to the beams 22 or sheets 26 on either end of cattle guard 10.

Various modes of carrying out the invention are contemplated as being within the scope of the following claims particularly pointing out and distinctly claiming the subject matter which is regarded as the invention.

What is claimed is:

1. A base for a cattle guard having a grid for preventing the passage of cattle across the guard, said base comprising: a pair of spaced side members; each of said side members having a side wall with a box-like flange member normal to said side wall and extending into said base; each of said flange members having an upper portion receiving said grid and a lower portion, each of said side members having at least one column positioned between said flange member upper and lower portions, said base having elements extending between said side members for retaining same in the spaced relationship, said elements comprising channels extending between the lower portions of said side members.

2. An improved cattle guard formed of components suitable for on-site assembly and comprising:
    a grid positionable generally flush with the surface of the ground when said guard is installed for preventing passage of cattle in a direction of travel across the guard, said grid having a plurality of spaced bars lying transverse to the direction of travel across the guard and a plurality of spaced beams fastened beneath said bars for supporting same, said beams lying parallel to the direction of travel across the guard; and
    a base positionable in the ground below said grid when said guard is installed for supporting said grid, said base comprising a pair of spaced side members lying transverse to the direction of travel across the gate, each of said side members having a side wall with a box-like flange member normal to said side wall and extending into said base, said flange members having upper and lower portions and end portions, said grid being positionable, in use, with said beams resting on said flange member upper portions, locking means between said grid and base for retaining said grid in position on said base, a plurality of columns positioned between said flange member upper and lower portions and alignable with the beams of said grid for supporting same, said base having a pair of bars fastenable to said side members for retaining same in the spaced relationship.

3. The improved cattle guard according to claim 2 including end walls affixed to each end of said base.

4. The improved cattle guard according to claim 2 including side wings for connecting the cattle guard to adjacent fencing.

5. An improved cattle guard (10) formed of components suitable for on-site assembly and comprising:
    a grid (16) positionable generally flush with the surface of the ground, when said guard is installed, for preventing passage of cattle in a direction of travel (A) across the guard; and
    a base (18) positionable in the ground below said grid when said guard is installed for supporting said grid, said base comprising a pair of spaced side members (28), each of said side members having a side wall (32) with a flange member (34) normal to said side wall and extending into said base, said flange members having upper and lower portions, said grid (16) being positionable, in use, on said flange member upper portions, said side members having at least one column (42) positioned between said flange member upper and lower portions for supporting said grid, said base (18) having elements (52) extending between said side members (28) for retaining same in the spaced relationship;
    said base (18) having end walls (30) with openings (50) in the lower portions thereof permitting the passage of fluids through said base.

6. The improved cattle guard according to claim 5 wherein said side members lie transverse to the direction of travel across said guard.

7. The improved cattle guard according to claim 5 further including locking means between said grid and base for retaining said grid in position on said base.

8. An improved cattle guard (10) formed of components suitable for on-site assembly and comprising:
- a grid (16) positionable generally flush with the surface of the ground, when said guard is installed, for preventing passage of cattle in a direction of travel (A) across the guard; and
- a base (18) positionable in the ground below said grid when said guard is installed for supporting said grid, said base comprising a pair of spaced side members (28), each of said side members having a side wall (32) with a flange member (34) normal to said side wall and extending into said base, said flange members having upper and lower portions, said grid (16) being positionable, in use, on said flange member upper portions, said side members having at least one column (42) positioned between said flange member upper and lower portions for supporting said grid, said base (18) having elements (52) extending between said side members (28) for retaining same in the spaced relationship;
- said elements (52) extending between said side members (28) of said base comprise channels extending between the lower portions of said side members.

9. The improved cattle guard according to claim 8 wherein said grid has a plurality of spaced beams and wherein said beams rest on said flange member upper portions when said grid is positioned on said base.

10. The improved cattle guard according to claim 9 wherein said grid has a plurality of spaced bars lying transverse to the direction of travel across said guard and fastened to said spaced beams.

11. An improved cattle guard (10) formed of components suitable for on-site assembly and comprising:
- a grid (16) positionable generally flush with the surface of the ground, when said guard is installed, for preventing passage of cattle in a direction of travel (A) across the guard;
- a base (18) positionable in the ground below said grid when said guard is installed for supporting said grid, said base comprising a pair of spaced side members (28), each of said side members having a side wall (32) with a flange member (34) normal to said side wall and extending into said base, said flange members having upper and lower portions, said grid (16) being positionable, in use, on said flange member upper portions, said side members having at least one column (42) positioned between said flange member upper and lower portions for supporting said grid, said base (18) having elements (52) extending between said side members (28) for retaining same in the spaced relationship;
- locking means between said grid and base for retaining said grid in position on said base; and
- said grid (16) having a plurality of spaced beams (22) and wherein said beams rest on said flange member upper portions when said grid is positioned on said base, and said locking means (46) including locking elements (48) mounted on said flange members (34) and extending between pairs of spaced beams (22) for preventing said grid from shifting on said base.

12. The improved cattle guard according to claim 11 including further locking elements (50) mounted on said spaced beams (22) and coacting with said locking elements (48) on said flange members (34) for preventing said grid (16) from shifting on said base (18).

* * * * *